Jan. 4, 1966 F. L. GOODWIN, JR., ET AL 3,226,802

METHOD OF MAKING A MATRIX BOARD SYSTEM

Filed Oct. 8, 1959

3 Sheets-Sheet 1

INVENTORS
FRANCIS L. GOODWIN JR.,
WILLIAM T. HOWARTH &
WILLIAM NOWICK
BY
ATTORNEY

Jan. 4, 1966 F. L. GOODWIN, JR., ETAL 3,226,802

METHOD OF MAKING A MATRIX BOARD SYSTEM

Filed Oct. 8, 1959

3 Sheets-Sheet 2

INVENTORS
FRANCIS L. GOODWIN JR.,
WILLIAM T. HOWARTH &
WILLIAM NOWICK
BY
ATTORNEY

INVENTORS
FRANCIS L. GOODWIN JR.,
WILLIAM T. HOWARTH &
WILLIAM NOWICK
BY
ATTORNEY

United States Patent Office 3,226,802

Patented Jan. 4, 1966

3,226,802

METHOD OF MAKING A MATRIX BOARD SYSTEM

Francis L. Goodwin, Jr., Silver Spring, William T. Howarth, Adelphi Hills, and William Nowick, Bowie, Md., assignors to ACF Industries, Incorporated, New York, N.Y., a corporation of New Jersey Filed Oct. 8, 1959, Ser. No. 845,232

4 Claims. (Cl. 29—155.5)

This invention is directed to the structure and technique for making predetermined connections between large numbers of circuit terminals. The invention is one utilizing a matrix board for such purposes.

In certain types of computer devices, it is necessary to provide various arrangements of circuit connections between two or more arrays of circuit terminals. In practice, to make such connections, a matrix board is positioned between the arrays of terminals. On the surfaces of the matrix board, conductive paths provide connections between the terminals of one array with terminals of another array. Different boards are used to provide other arrangements of connecting the terminals of one array with the terminals of another array.

A matrix board that has been used in the past is a crossbar board consisting of a dielectric sheet having conductors of conductive material formed on one surface and parallel to each other. On the opposite surface of the dielectric board a second formation of spaced parallel conductors is formed normal to the direction of the conductors on the first surface. Apertures are then either drilled or punched through the matrix board at the intersections of the overlying parallel conductors on one surface with the parallel conductors on the second surface. A terminal connector is fixed to the matrix board at one end of each conductor and is conductively connected to the respective conductor. If a conductive connection is made through any one of the apertures, to join the two conductors which intersect at that aperture, then the terminal connectors of these two connected intersecting conductors will be conductively joined. In this manner, any one conductor on one side of the crossbar matrix board may be connected to any one or more of the conductors on the opposite side of the board. Such connections between the intersecting conductors on opposite sides of the matrix board are normally made in accordance with a predetermined arrangement. Several boards can be used each with a different arrangement to provide a method for static switching of the circuitry of any device, such as a computer, with which the matrix board is used.

It has been customary in the past to provide the connection between intersecting conductors on opposite sides of a matrix board by using rivets or eyelets. Such connections are normally made by the operator of the computer device to provide the correct circuit connections required for a given operation. Such connections are not normally made under the supervision of the manufacturer of the matrix board. With the use of rivets or eyelets, loose connections may often develop, due to the lack of skill in making the connections by the operator, or due to looseness in the mechanical connections developing during use. Furthermore, the application of rivets to the matrix board has not been an automatic operation and tends to be tedious and slow.

It is, therefore, an object of this invention to provide a novel and efficient method for connecting conductors of a matrix board.

It is a further object of the invention to provide a novel technique for connecting the intersections of the conductors of a crossbar matrix board accurately and effectively.

It is a further object of the invention to provide a crossbar matrix board for static switching, in which the connections between intersecting conductors are accurately made with good conductivity characteristics in a novel manner.

It is another object of this invention to provide a novel technique for rapidly and accurately forming a crossbar matrix board with a predetermined arrangement of connectors between intersecting conductors.

It is another object of the invention to provide a novel crossbar matrix board to be used in static switching between a plurality of arrays of terminals, and in which the conductive paths between the terminals are accurately and effectively formed.

The invention is broadly a technique for fabricating a crossbar matrix board having the conductive paths between intersecting strips on the board accurately and well formed.

The technique consists of that in which the matrix board, having parallel conductors on opposite sides of the board, is fabricated by forming apertures through the board at each intersection of the conductors on one side with the conductors on the other. A conductive path is produced through each aperture, thus formed, by plating a film of metal within each aperture connecting conductors on one side with the intersecting conductors on the opposite side. A punch device is provided with which the conductive paths between opposite sides of the matrix board, which are not wanted, may be removed by punching out the apertures to eliminate the plated conductive paths in these apertures. The remaining unpunched apertures, then, retain their conductive connection to provide the desired circuit connections required by a predetermined arrangement.

Certain types of electrically operated devices, such as computing machines for example, utilize many circuits set up in different arrays. Operation of such devices require specific arrangements of connections between the several circuit arrays. Furthermore, in more versatile devices, the arrangement of circuit connections may be varied from situation to situation. The operation of such a device is one, then, in which for certain conditions a given predetermined arrangement of circuit connections is required, while, for a second condition, another predetermined arrangement of connections must be used. This, then, requires means which will enable the operator to readily make connections between the circuits of the device and in accordance with a predetermined program. An effective means which has been used for performing this switching operation is that in which the circuits utilized are connected to terminal arrays and a matrix connector board is used to joint the terminals of one array with those of another array in accordance with a predetermined arrangement.

Figure 1:
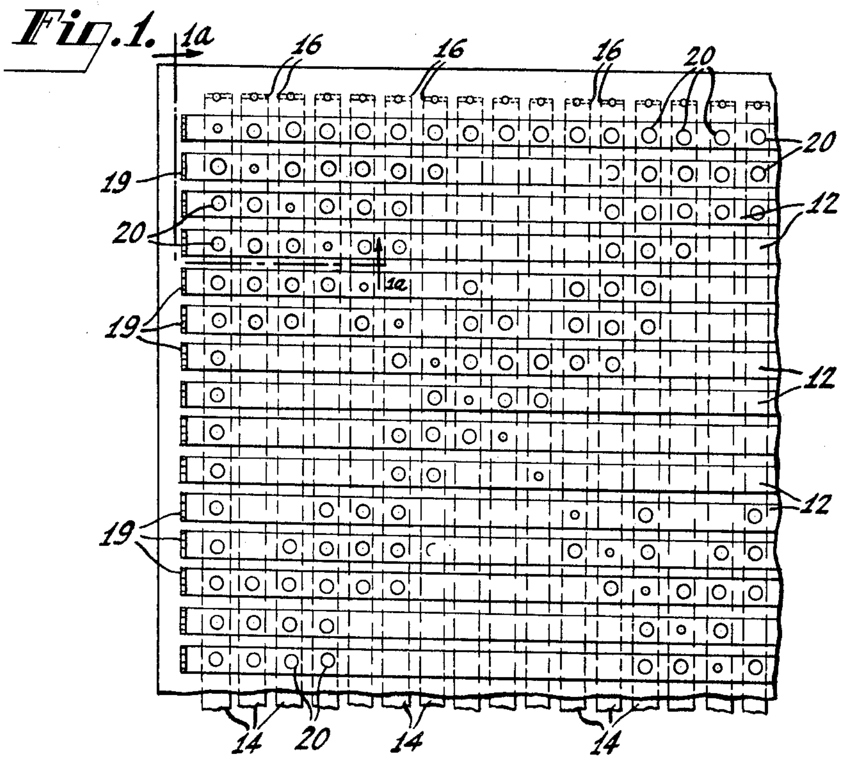
FIG. 1 is a showing of a crossbar matrix board in accordance with the invention.

FIG. 1 discloses a type of crossbar matrix board, which has been utilized for the purposes of connecting together the terminals of one array with the terminals of another. The matrix board of FIG. 1 has been improved in accordance with the invention to be described. The matrix board consists of a rectangular sheet 10 of insulating material, which may be made of filament glass fabric bonded with an epoxy resin. On one surface of board 10 there is formed a group of 32 closely spaced conductors 12, which are formed parallel to each other and to opposite edges of the board 10. On the opposite surface of board 10 there is formed a second group of 32 parallel conductors 14 which are closely spaced from each other and are parallel to the other two opposite edges of board 10. The group of conductors 12 are positioned at right angles to the group of conductors 14, so that each conductor of either group will cross each conductor of the other group. Thus, there are 32 overlying intersecting portions of each conductor of one group with all of the conductors of the other group, thus making 1024 overlying conductor portions.

Figures 1A, 6:
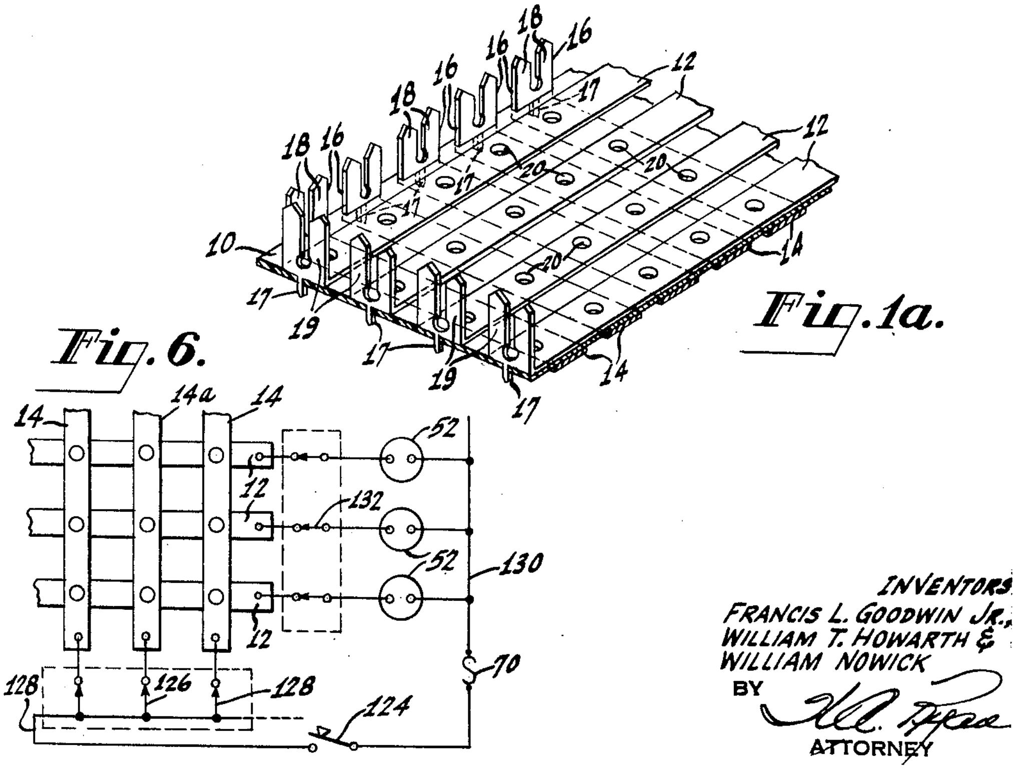
FIG. 1*a* is a perspective view, partly in section, of the structure of FIG. 1 along line 1*a*—1*a*.
FIG. 6 is a schematic diagram of a portion of the testing circuit of the perforator device of FIGS. 4 and 5.

The conductors 12 and 14 may be formed in any manner and of any appropriate conductive material. Normally the conductors are formed as strips from a plating of copper onto the surfaces of the matrix board 10. At one end of each conductor 14, there is fixed a terminal contact member 16 (FIG. 1*a*). Each contact member 16 has a portion 17 extending through board 10 to make contact with the ends of conductors 14 and a bifurcated body portion consisting of two spaced prongs 18. Similar contacts 19 are fixed to board 10, with one contact 19 conductively connected to one end of each conductor 12. Thus, as shown in FIG. 1, terminals 16 form an aligned array connected to the adjacent ends respectively of conductors 14, and, in a similar manner, terminals 19 form a second aligned array joined respectively to the adjacent ends of conductors 12.

At each overlying intersecting portion of conductors 12 and 14, there is formed an aperture 20 extending through board 10 from the respective conductor 12 to the corresponding intersecting conductor strip 14. Any one of the terminals 16 may be connected with any one of the terminals 19 by fixing a rivet or eyelet through the aperture 20 at the intersection of the conductors joined respectively to the terminals 16 and 19. In this manner, a predetermined arrangement of connections may be set up between the array of terminals 16 and the terminals 19.

Figure 2:
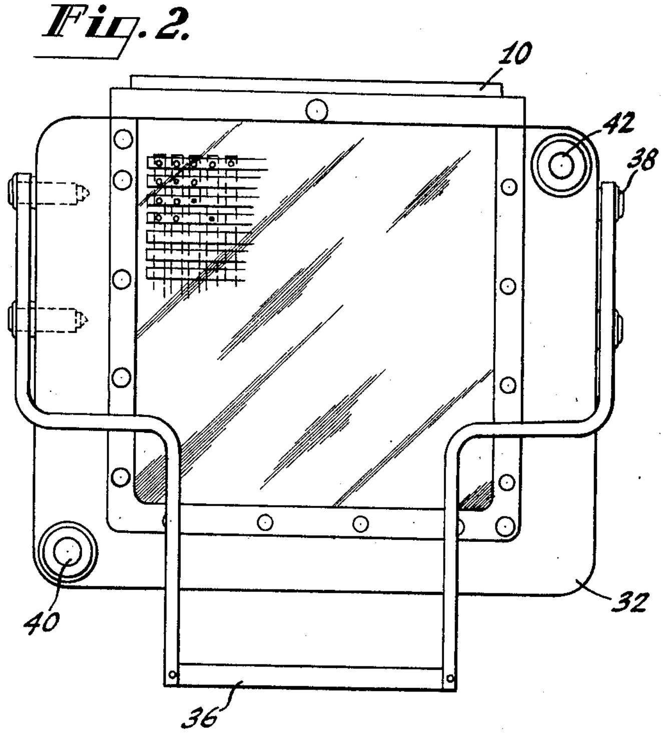
FIG. 2 is an elevational view of a matrix board holder.
Figure 3:
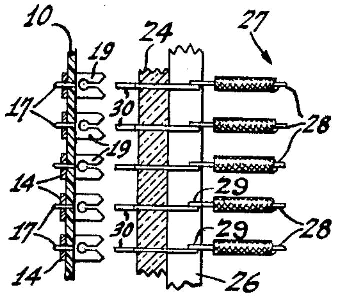
FIG. 3 is a side elevational view, partially in section, of the matrix board holder of FIG. 2.

FIGS. 2 and 3 disclose a matrix board holder in which the matrix board 10 is used as a static switching device between a plurality of circuits. The matrix board holder comprises a base panel 24 adapted to be fixed to a mounting panel 26 of a circuit device 27 (FIG. 3) such as a computer for example. A set of lead-in wires 28 are shown passing parallel to each other in a vertical plane through an aperture 29 in mounting panel 26. Lead-in wires 28 are each connected to a different terminal blade 30 fixed in vertical array in base panel 24. A second set of lead-in wires (not shown) are connected through the mounting panel 26 to a horizontal array of terminal blades fixed in the base panel 24 of the matrix holder, in a manner similar to that shown for the vertical arrangement in FIG. 3.

The matrix board 10 is used to connect any predetermined arrangement of the vertical array of lead-in wires 28, with certain ones of the horizontal array of lead-in wires. The terminal blades 30 are formed of flat tongues, adapted to be friction fitted between the prongs 18 of a corresponding terminal contact member 19.

The matrix board holder includes a movable carrier block 32 having a slot or pocket of a size for receiving the matrix board when inserted from the top of block 32. Matrix board 10 is positioned in block 32 with the terminal contact members 16 and 19 extending respectively through a slot in block 32 toward the blade terminals 30 fixed in the base panel 24. When the board 10 is fully positioned within the slot of block 32, each of the contact members 16 and 19 is in alignment respectively with a corresponding terminal connector 30.

An operating handle 36 is pivotally fixed at 38 to the mounting panel 26. Moving the handle outwardly away from the mounting panel will bring the support block 32 away from the base panel 24 and withdraw the contact members 16 and 19 each from their respective terminal blade 30. Moving the handle inwardly toward the mounting panel 26 will guide the support block 32 along the guide pins 42 and 40 to bring the contact members 16 and 19 into position respectively against the terminal blades 30 fixed to the base panel 24. Continued movement of handle 36 toward panel 26 will force the contact terminals 16 and 19 each onto their respective terminal blades 30.

The use of rivets to make connections between intersecting connectors 12 and 14 of the matrix board is one which requires the application of the rivet or eyelet by the operator of the computer device. That is, the manufacturer of the matrix board 10 will not necessarily be the agent to fix the rivets to the matrix board. Accordingly, the application of rivets to the matrix board 10 may be done by inexperienced or unskilled operators often resulting in loose connections due to poorly applied rivets or eyelets. Furthermore, the task of setting up an arrangement of connections between the intersecting pattern of conductors is one which is relatively slow and inefficient.

In accordance with the invention, the fabrication of the matrix board 10 includes the formation of conductive paths through each of the apertures 20. These conductive paths are formed by immersing board 10 into a plating bath and forming a plated metallic coating in each aperture 20. The plated coating extends through each aperture 20 and firmly adheres to the metallic conductors 12 and 14 connected by the apertures 20. This method of fabricating matrix plate 10 is one in which the manufacturer can readily determine by testing whether each plated aperture 20 forms a sufficiently good conductive path between the respective conductors 12 and 14. Any defective plating of the conductive paths in apertures 20 will result in rejection of the matrix plate 10, prior to its use.

To utilize a matrix board made in this manner and in which a conductive path is formed in each aperture 20, it is necessary to eliminate the conductive paths in those apertures, through which a connection is not desired between respective conductors 12 and 14. In accordance with the invention then, those apertures, in which the conductive paths are unwanted, are drilled or punched out to form larger apertures, which process will eliminate completely the conductive paths in the enlarged apertures. The undrilled or unpunched apertures retain the conductive paths, in accordance with any predetermined circuit arrangement, which is desired.

Figure 4:
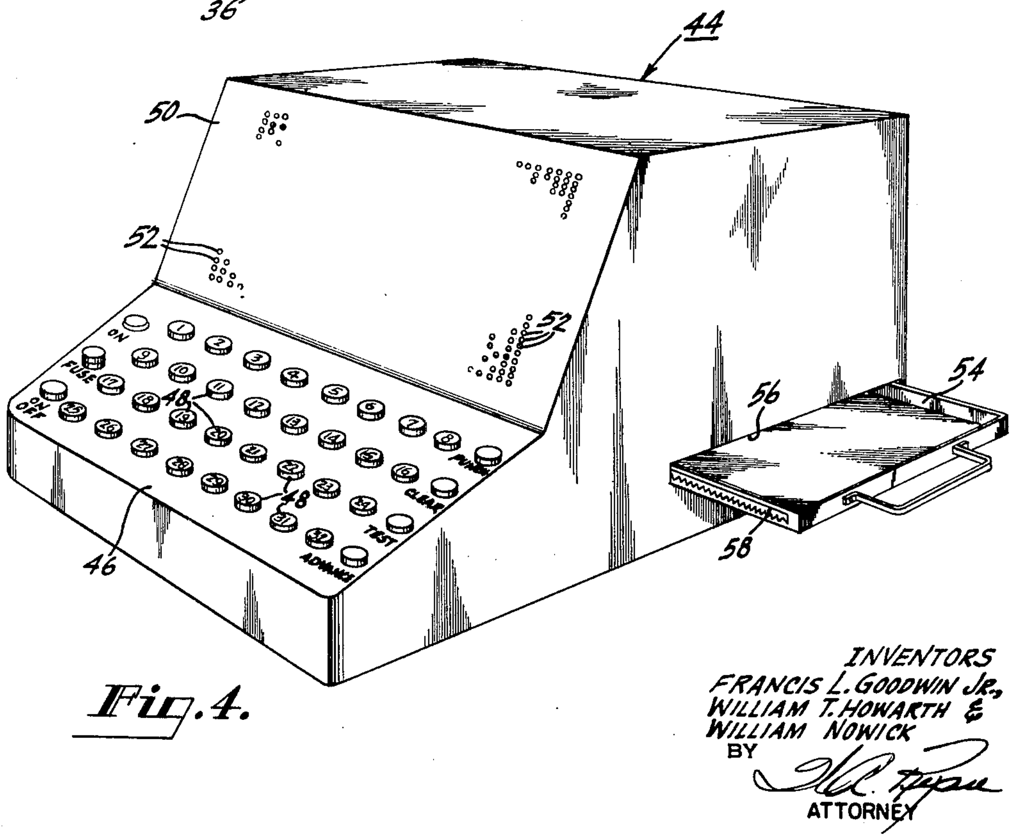
FIG. 4 is a perspective view of a matrix board perforator device in accordance with the invention.

FIG. 4 discloses a matrix board perforator device 44, with which an operator may accurately and rapidly punch out the unwanted apertures of a matrix board. The device 44 comprises a keyboard 46 having a plurality of operating keys 48. A panel 50 mounts a plurality of indicator lights 52. A drawer 54 is mounted at one side of the perforator device 44 in a slot 56. Means are provided so that the drawer can slide through slot 56 into the perforator 44 for punching operation. A toothed rack 58 is fixed to one side of drawer 54 and an escapement latch 60 shown in FIG. 5 extends between the saw teeth of rack 58 to maintain the drawer 54 in any desired position. Drawer 54 is urged by spring 61 (FIG. 5) into the housing of the perforator 44 and when released by latch 60, will move inwardly a distance equal to the space of one tooth of the rack 58.

Figure 5:
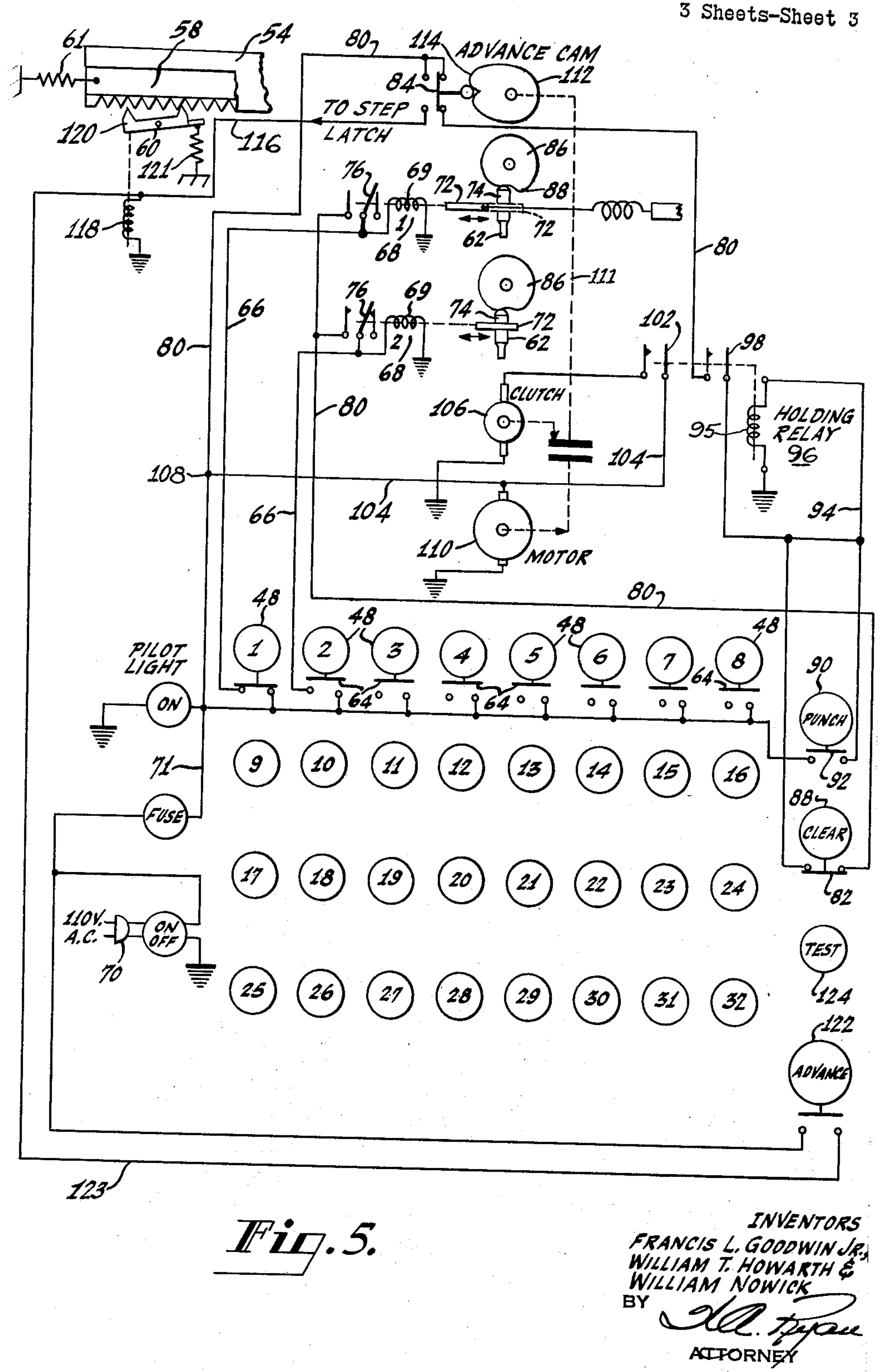
FIG. 5 is a schematic representation of the perforator device of FIG. 4 and a portion of the operating circuitry of the perforator.

To punch the apertures through board 10, the matrix board is placed within the drawer 54 in its outwardmost position. Latch 60 is operated to permit the drawer to carry board 10 into its position for punching. In this position, all 32 of the apertures 20 in the first conductor 14 are aligned with a punch 62 (FIG. 5).

The keyboard of the punch device 44 has 32 keys numbered 1 to 32 respectively, corresponding to the 32 apertures of each row of apertures. Each numbered key is connected to a switch 64 (FIG. 5) for closing a respective circuit 66 connecting a relay coil 69 to a source of current 70 through lead 71. FIG. 5 discloses keys numbered 1 and 2 only as being connected to their respective circuits 66 for operating respective relays 68. It is to be understood, however, that all of the numbered keys 48 are connected to similar circuits and relays 68. The omission of the remaining circuits has been for the purpose of clarity of the drawing.

The closing of any one of the circuits 66, such as the one connected to key numbered 1, for example, will operate the respective relay 68 of that circuit, which displaces the spacing bar 72 between the respective punch 62 and a punch operating pin 74. Each relay 68, when operated, also closes a switch 76 to connect the coil 69 of relay 68 into a holding circuit 80. The holding circuit 80 is connected to current source 70 through the normally closed clearing switch 82, the advance cam switch 84 and lead 71. The holding circuit 80 thus retains the relay coil 69 energized after the operating key 48 has been released.

Each of the punches 62 are operated from a punch cam 86 having an elevated portion 88 for driving the punch pin 74 downwardly. If the spacing bar 72 is retained between the punch pin 74 and the respective punch 62, the punching operation will take place. However, if the spacing bar 72 is withdrawn from between the respective punch pin 74 and punch 62, there is sufficient clearance such that operation of the punch cam 86 will not depress the punch.

Thus, if any conductive path is to be retained in the first row of apertures in the matrix board, the operation of the respectively numbered key 48 by the operator will prevent the aperture from being punched out, in the manner described above. The operator may work from a predetermined list of apertures, whose conductive paths are to be retained. With such a schedule, the appropriate keys 48 are pressed for each row in turn. If at any time the wrong key 48 is pressed before punching has taken place, the operator may press the clear key 88 to open switch 82 of circuit 80 to cut off current from any relay 68, which is being retained operative by its respective holding switch 76 and reset the keyboard again.

When the operator is ready to punch out the apertures of the first row, after he has disabled the one or more punches for the purpose of retaining the conductive path in certain apertures, he presses the punch key 90 to close switch 92 of circuit 94 connecting current source 70 to the coil 95 of a relay 96. Relay 96 closes a switch 98 to connect relay coil 95 to circuit 80. This connects coil 95 to current source 70 through circuit 80 and the advance cam switch 84. Operation of relay 96 simultaneously closes switch 102 to pass current through a magnetic clutch 106 connected to the source of current 70 by circuit 104, which is connected to circuit 80 at terminal 108. Circuit 104 also feeds current to a constantly running motor 110 from terminal 108. The operation of clutch 106 allows motor 110 to drive the cam shaft of cams 86 to turn the cams in a clockwise direction as shown in FIG. 5. All of the punches are thus operated except those which have been disabled.

Also mounted on the cam shaft 111, for simultaneous operation by motor 110, is an advance cam 112 having an elevational portion 114 for operating switch 84 at the end of one revolution of cam shaft 111. The operation of switch 84 opens circuit 80 to deenergize the holding solenoid coil 96, as well as any of the relay coils 69, which have been retained in operative condition by their holding switches 76. This permits switch 102 to open, which permits clutch 106 to disconnect motor 110 from the cam shaft 111. Also, the de-energization of any one of the punch disabling relays 68 permits the return by spring bias of the respective spacing bar 72 between its punch pin 74 and punch 62. The operation of switch 84 by cam portion 114 simultaneously connects circuit 116 from the current source 70 through the stepping latch operating solenoid 118. Operation of solenoid 118 rocks the pawl 120 counterclockwise, which with subsequent clockwise movement of pawl 120 by spring 121 after de-energization of coil 118 with overtravel of advance cam 112, permits the tray 54 to move the space of one tooth of rack 58. This brings the next or second row of apertures of the matrix board into punch position and the punching operation is repeated in the manner described above. Accordingly, then, each row of apertures can be punched out, retaining only those conductive connections called for by the predetermined program. After all of the 32 columns have been punched, the matrix board is removed by pulling out the drawer 54.

Testing circuitry may be provided for checking possible operating errors and to check each column of apertures individually. The matrix board is retained in the drawer 54 for this operation and is stepped successively from column to column to test each column individually. For this purpose, an advance key 122 is provided on the keyboard 46 of the perforator 44. Pressing the advance key 122 closes a circuit 123 connecting the step latch solenoid 118 directly to the current source 70. To test any column, a test key 124 is operated, when that column of apertures has been advanced to the test position. In the test position (FIG. 6), the conductive strip 14*a* corresponding to the column of apertures to be tested is connected to the current source 70 through its respective switch 126 and connector 128. Each of the rows of conductor strips 12 are connected in different parallel circuits with a neon bulb 52 to the other side of current source 70 by a common connector 130. A single movable switch 132 can be manually operated to close, in turn, the circuit through each conductor strip 12 and its bulb 52. Operation of a particular bulb 52 will indicate a conductive path between conductor strip 14*a* and the respective cross-conductor 12. A separate set of parallel circuits and bulbs 52 may be provided for each vertical conductor 14, or the single set of bulbs 52 shown in FIG. 6 may be used for testing all conductors 14 as described above. Switches 126 and 132 may be moved to other positions to test each strip 14 with the strips 12 either manually or by some type of motor-driven commutation structure. If the test circuit includes a separate bulb 52 for each aperture 20 with all bulbs 52 arranged in a panel as indicated in FIG. 4, switches 126 and 132 may be eliminated and pressing the test key 124 will give the operator a visual representation of all of the paths between the vertical and horizontal strips. By comparing this with his program chart, he can readily check column by column the accuracy of the punching operation.

We claim:

1. The method of processing a crossbar matrix board to provide a plurality of connectors between a first system of spaced parallel conductors on one face of a board of insulating material and a second system of spaced parallel conductors on the other face of said board, the parallel conductors of said first system extending across the parallel conductors of said second system, said method comprising the steps of, forming a plurality of apertures at the cross-overs of said conductors each extending through said matrix board and said conductors, said apertures being appreciably narrower than the width of the conductors, forming a metallic coating in each aperture to provide a conducting path through each one of said apertures connecting respective overlying portions of said conductors, and removing said conducting paths from a plurality of said apertures, whereby the conducting paths retained in others of said apertures form said connectors.

2. The method of processing a crossbar matrix board to provide a plurality of connectors between a first system of spaced parallel conductors on one face of a board of insulating material and a second system of spaced parallel conductors on the other face of said board, the parallel conductors of said first system extending across the parallel conductors of said second system, said method comprising the steps of, forming a plurality of apertures at the cross-overs of the conductors each extending through said matrix board and the conductors, said apertures being appreciably narrower than the width of the conductors, forming a metallic coating in each aperture providing a conducting path through each one of said apertures connecting respective overlying portions of said conductors, and removing said conducting paths from a plurality of said apertures by punching out the metallic coating on the walls of said plurality of apertures, whereby the conducting paths retained in others of said apertures form said connectors.

3. The method of processing a crossbar matrix board to provide a plurality of connectors between a first system of spaced parallel conductors on one face of a board of insulating material and a second system of spaced parallel conductors on the other face of said board, the parallel conductors of said first system extending across the parallel conductors of said second system, said method comprising the steps of, forming a plurality of apertures at the cross-overs of said conductors each extending through said matrix board and the conductors, said apertures being appreciably narrower than the width of the conductors, forming by plating a conducting path through each one of said apertures connecting respective overlying portions of said conductors, and removing said conducting plated paths from a plurality of said apertures, whereby the conducting paths retained in others of said apertures form said connectors.

4. The method of processing a crossbar matrix board to provide a plurality of connectors between a first system of spaced parallel conductors on one face of a board of insulating material and a second system of spaced parallel conductors on the other face of said board, the parallel conductors of said first system extending across the parallel conductors of said second system, said method comprising the steps of, forming a plurality of apertures at the cross-overs of said conductors each extending through said matrix board and the conductors, said apertures being appreciably narrower than the width of the conductors, plating conducting paths through each aperture connecting respective overlying portions of the conductors, punching a plurality of said apertures with larger holes to remove said conducting paths from said plurality of apertures without severing said conductors, and retaining said conducting paths in the remainder of said apertures.

References Cited by the Examiner

UNITED STATES PATENTS

| | | | |
|---|---|---|---|
| 290,845 | 12/1883 | Breckenridge | 29—155.5 |
| 2,451,725 | 10/1948 | Franklin | 29—155.5 |
| 2,613,252 | 10/1952 | Heibel | 29—155.5 |
| 2,647,581 | 8/1953 | Gardinor | 164—113 |
| 2,694,249 | 11/1954 | Kapp | 29—155.5 |
| 2,699,424 | 1/1955 | Nieter | 29—155.5 X |
| 2,737,241 | 3/1956 | Doty | 164—113 |
| 2,762,113 | 9/1956 | Daniels | 29—155.5 |
| 2,824,294 | 2/1958 | Saltz | 29—155.5 |
| 2,889,532 | 6/1959 | Slack. | |
| 2,932,772 | 4/1960 | Bowman et al. | 29—155.5 |
| 2,965,952 | 12/1960 | Gillett et al. | 29—155.55 |
| 2,038,105 | 6/1962 | Brownfield | 174—68.5 |

OTHER REFERENCES

Scientific American, September 1947, pp. 115–118.

Product Engineering, September 1947, p. 168.

Proceedings of IRE, August 1958, p. 86A.

WHITMORE A. WILTZ, *Primary Examiner.*

JOHN F. CAMPBELL, *Examiner.*

J. MULHOLLAND, J. W. BOCK, P. M. COHEN, *Assistant Examiners.*